Feb. 21, 1967
N. A. KAMMILLER
3,305,793
D.C. TO A.C. CONVERTER WITH AMPLITUDE
REGULATION AND OVERLOAD PROTECTION
Filed Aug. 16, 1965
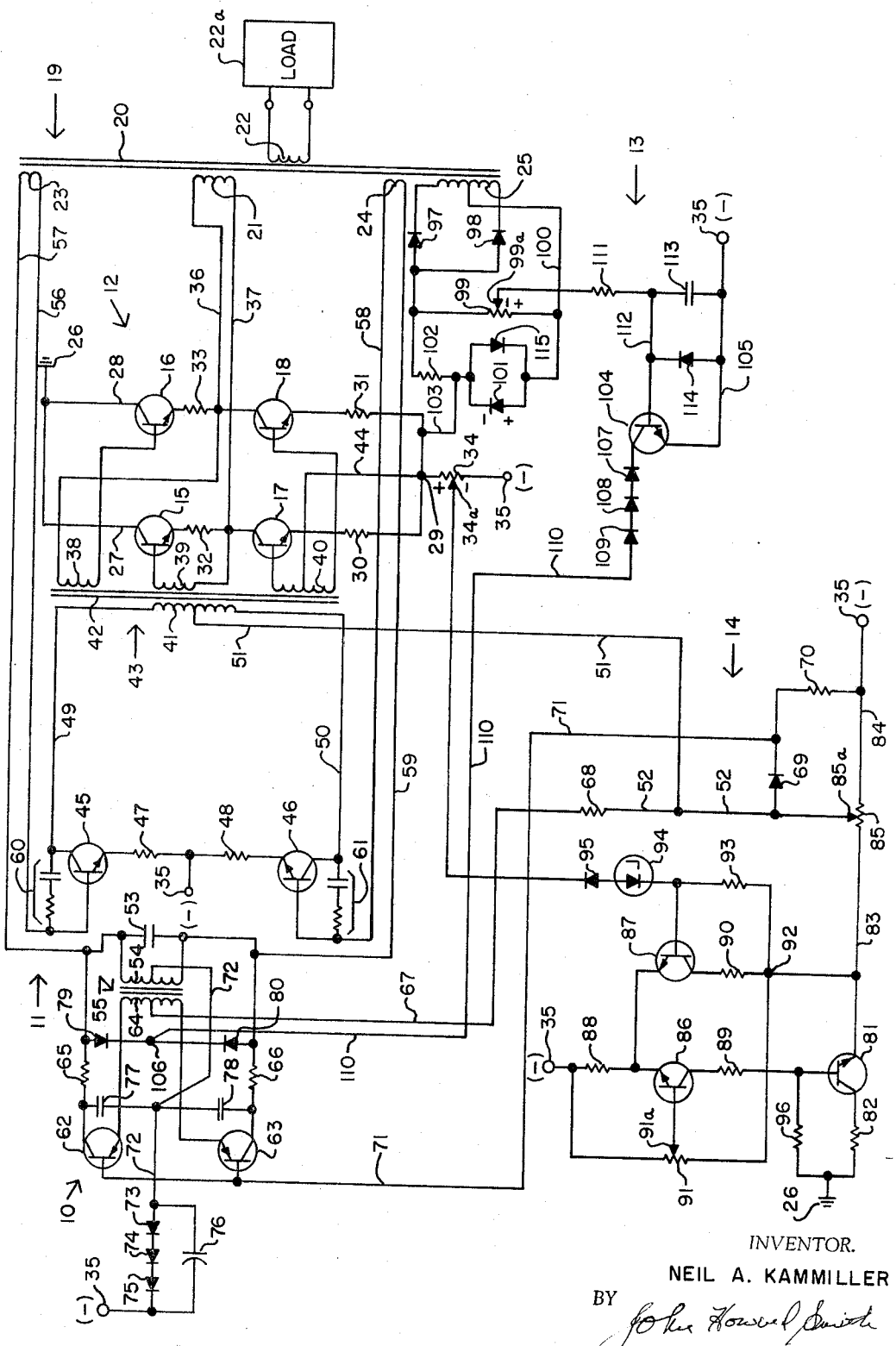
INVENTOR.
NEIL A. KAMMILLER
BY John Howell Smith
ATTY United States Patent Office 3,305,793
Patented Feb. 21, 1967

3,305,793
D.C. TO A.C. CONVERTER WITH AMPLITUDE REGULATION AND OVERLOAD PROTECTION
Neil A. Kammiller, North Olmsted, Ohio, assignor to Lorain Products Corporation, a corporation of Ohio
Filed Aug. 16, 1965, Ser. No. 480,063
12 Claims. (Cl. 331—62)

This invention relates to frequency generators and is directed more particularly to control circuitry for such generators.

Circuits in which the output load current is prevented from exceeding a predetermined maximum value even in the event of a short circuit applied across the output terminals are known. Generally these circuits accomplish the current limiting action by reducing the output voltage by whatever amount is necessary to prevent the load current from becoming greater than the predetermined value. In such circuits, when the predetermined maximum value is reached, the current will not increase regardless of how low the load impedance becomes. Thus under overload conditions, circuits of the above type operate in a constant current mode at or above the maximum rated output current.

It will be seen that the power dissipation is substantial in the components of an electrical circuit operating in a constant current mode at or above the rated maximum current. Consequently, considerable heat is generated. Since excessive heat is detrimental to semiconductors, it is often desirable to operate circuits utilizing such devices at substantially zero output current and voltage under overload conditions as when the load impedance becomes less than a predetermined value. Heat generated in the components of the circuits is thus minimized.

Accordingly, it is an object of this invention to provide a D.-C. to A.-C. converter having improved control circuitry which reduces the output voltage and current supplied to a load to substantially zero in the presence of an overload condition whereby the converter switches from a normal or first stable state of operation to a cutoff or second stable state.

It is another object of the invention to provide circuitry of the above character which responds instantaneously to overload conditions.

It is a further object of the invention to provide an A.-C. generator having the above control circuitry, which circuitry minimizes the generator output voltage variations resulting from changes in output load current.

Still another object of the invention is to provide a D.-C. to A.-C. converter having control circuitry in which a bistable voltage source is connected between a load current responsive means and an output voltage responsive means to produce a resultant voltage on the output voltage responsive means. This resultant voltage is utilized to control a cutoff switch which, when closed, de-energizes the oscillator section of the converter so that the output voltage and current thereof are reduced to substantially zero.

An additional object of the invention is to provide an A.-C. generator having a control circuit of the above character and including a bypass means paralleling said bistable voltage source whereby upon the occurrence of a relatively large load current surge the bistable voltage source is in effect removed from the circuit so that the cutoff switch may be closed instantaneously.

It is yet another object of the invention to provide a D.-C. to A.-C. converter having a control circuit including a nonlinear, unidirectional conducting device such as a diode which is forward biased by current from an output voltage responsive means. The voltage of the diode is interposed between the load current responsive means and the output voltage responsive means. The resultant voltage produced on the output voltage responsive means by this arrangement is, as shown in the present embodiment, applied to a transistor switch connected between the oscillator and a D.-C. source to control the conduction of the transistor. If this transistor is rendered conducting, the oscillator ceases to operate and the converter output voltage and current become substantially zero.

Other objects and advantages of the invention will become apparent from the following description and accompanying single drawing which is a schematic illustration of circuitry embodying the invention.

Referring to the single drawing, it will be seen that the circuitry embodying the invention may include an oscillator section 10, a driver section 11, a power section 12, a control circuit section 13 and a voltage regulating section 14. The power section 12 may be provided with suitable N-P-N type transistors 15, 16, 17 and 18 and a transformer 19 having a core 20 on which is carried a primary winding 21, an output winding 22, feedback windings 23 and 24 and a control circuit winding 25.

In order to form the transistors 15 through 18 into a bridge configuration, the collector electrodes of the transistors 15 and 16 are connected to a positive potential as at ground 26 through respective leads 27 and 28 while the emitter electrodes of the transistors 17 and 18 are connected to a junction 29 through respective emitter resistors 30 and 31. The connections of the power section transistors are completed by suitable bias resistors 32 and 33 connected from the emitter electrodes of the transistors 15 and 16 to the collector electrodes of the transistors 17 and 18, respectively, and by a resistor 34 connected between the junction point 29 and a negative potential as at 35. The current traversing the resistor 34 is proportional to the output current of the frequency generator being supplied to the load. Accordingly, the resistor 34 serves as a load current responsive means.

To supply alternating current to the primary winding 21 of the transformer 19, that winding is connected between the collector electrodes of the transistors 17 and 18 by means of leads 36 and 37. Thus the output voltage of the power bridge as developed between the collector electrodes of the transistors 17 and 18 is fed to the primary winding 21 and is increased by transformer action to the desired magnitude as appears on the output winding 22.

In a bridge type amplifier configuration, such as that used in the power section 12, the diagonally opposed transistors 15 and 18 conduct simultaneously when the diagonally opposed transistors 16 and 17 are nonconducting and the transistors 16 and 17 conduct when the transistors 15 and 18 turn off. To this end, drive windings 38, 39 and 40 with a center tapped primary winding 41 are wound on a core 42 of a driver transformer 43.

The conduction of the transistors 16 is controlled by connecting the drive winding 38 between the base electrode of that transistor and the lower end of the resistor 33 while the conduction of the transistor 15 is controlled by connecting the drive winding 39 between the base electrode of that transistor and the lower end of the resistor 32. To control the conduction of the transistors 17 and 18, the drive winding 40 is connected between the base electrodes of those transistors and a center tap of the drive winding 40 is connected to the junction point 29 through a lead 44. This completes the circuitry of the power section 12.

The driver section 11 serves to increase the power of the oscillator output signal to a value sufficiently great to drive the transistors 15, 16, 17 and 18 through their respective drive windings on the transformer 43. The driver section may include, by way of example, N-P-N type transistors 45 and 46 having their emitter electrodes connected to the negative potential at 35 through the respective resistors 47 and 48. To supply current to the primary winding 41 of the driver transformer 43, the collector electrodes of the transistors 45 and 46 are connected to opposite ends of the primary winding 41 via suitable leads 49 and 50. A center tap of the primary winding 41 is connected by means of a lead 51 to a lead 52 which, as will be explained presently, is maintained at a regulated positive potential with respect to the negative potential applied at the negative terminals 35.

The oscillator output signal which is to be increased in power by the driver section 11, is developed across a tank circuit comprising a capacitor 53 connected across a center tapped secondary winding 54 of an oscillator transformer 55. In order to apply the A.-C. voltage appearing across the capacitor 53 to the base electrodes of the transistors 45 and 46, the feedback winding 23 of the output transformer 19 is connected between the base electrode of the transistor 45 and the upper side of the capacitor 53 by means of the leads 56 and 57 and the negative feedback winding 24 is connected between the base electrode of the transistor 46 and the lower side of the capacitor 53 via the leads 58 and 59. The driver section 11 is completed by stabilizing resistance-capacitance networks 60 and 61 connected between the collector and base electrodes of the transistors 45 and 46, respectively.

The oscillator section 10 is formed by P-N-P type transistors 62 and 63, the emitter electrodes of which are connected to opposite ends of a feedback winding 64 of the oscillator transformer 55. The emitter-collector current paths of the oscillator transistors are completed by connecting the collector electrode of the transistor 62 to one side of the capacitor 53 through a resistor 65 and by connecting the collector electrode of the transistor 63 to the other side of the capacitor 53 through a resistor 66.

To energize the oscillator section 10, a center tap of the feedback winding 64 is connected to the regulating voltage on the lead 52 via a lead 67 and a resistor 68. Bias voltage for the transistors 62 and 63 is provided by connecting the base electrode thereof to a point on a temperature dependent voltage divider network comprising a diode 69 and a resistor 70 connected between the lead 52 and the negative potential as at 35 by means of a lead 71.

The oscillator transformer secondary winding 54 may be utilized to apply forward bias to the transistors 45 and 46 by connecting a center tap on the winding to the negative potential 35 through a lead 72 and diodes 73, 74, and 75. Because of the voltage drop across the diodes 73 through 75, the voltage applied to the center tap of the winding 54 and, consequently, to the base electrodes of the transistors 45 and 46 is slightly positive with respect to the voltage present on the emitter electrodes of those transistors. A capacitor 76 may be bridged across the diodes 73 through 75 to suppress voltage spikes or transients. Capacitors 77 and 78 may be connected between the lead 72 and the collector electrodes of the transistors 62 and 63, respectively, to suppress parasitic oscillations. The oscillator section is completed by diodes 79 and 80 which are serially connected across the capacitor 53 of the tank circuit. These diodes function to de-energize the output of the oscillator section in response to operation of the control section, as will be explained presently.

It is desirable to maintain the voltage applied to the load 22a at a relatively constant magnitude despite the current requirements of the load and variations of the D.-C. source voltage from which the converter is energized. To this end the voltage supplied to the oscillator and driver sections 10 and 11 through the leads 71 and 51 is controlled in a compensatory manner by the voltage regulating circuit section 14. The voltage regulating circuit is formed by an N-P-N type transistor 81 having its collector electrode connected to ground 26 through a resistor 82 and its emitter electrode connected to a negative terminal 35 via leads 83 and 84 and a potentiometer 85. The lead 52 through which regulated voltage is applied to the oscillator section 10 is connected to a wiper arm 85a provided on the potentiometer 85.

To vary the conduction of the transistor 81 in such a manner that the voltage on the lead 52 will be suitably regulated, there is provided a differential amplifier comprised of N-P-N type transistors 86 and 87. To form the differential amplifier, the emitter electrodes of the transistors 86 and 87 are commonly connected to a negative terminal 35 through a resistor 88, the collector electrodes of the transistor 86 is connected to the base electrode of the transistor 81 via a resistor 89 and the collector electrode of the transistor 87 is connected to the lead 83 by means of a resistor 90.

The differential amplifier compares the voltage appearing between the negative terminals 35 and a junction point 92 to a point of constant potential on a network formed by a resistor 93, a zener diode 94 and a temperature stabilizing diode 95. This network is connected between the junction 92 and a slider 34a provided on the resistor 34.

To make the desired voltage comparison, the base electrode of the transistor 86 is connected to a wiper arm 91a of a potentiometer 91, which potentiometer is connected between a negative terminal 35 and the junction 92, while the base electrode of the transistor 87 is connected to a point between the resistor 93 and zener diode 94. To complete the voltage regulating section 14, a resistor 96 is connected between ground 26 and the base electrode of the transistor 81 to provide a path for base current of the transistor 81 and collector current of the transistor 86.

The connection of the zener diode 94 to the wiper arm 34a of the resistor 34 is highly advantageous in that, as the voltage across the resistor 34 changes in accordance with variations in current drawn by the load 22a, the emitter-base voltage of the transistor 87 will vary correspondingly. With this arrangement, an increase in the voltage on the resistor 34 will cause the regulated voltage on the lead 52 to increase, thereby increasing the output voltage of the oscillator and driver sections. Thus, the decrease in the output voltage on the output winding 22 which would normally occur as the current supplied to the load increases is substantially cancelled by increasing the output voltage of the oscillator and driver sections.

If the zener diode 94 were connected to the negative potential at a terminal 35, the voltage regulating circuit section 14 would function to maintain the voltage on the lead 52 at a constant value with respect to the negative terminals 35. Accordingly, the voltage on the output winding 22 would be prevented from changing as a result of fluctuation of the D.-C. energizing voltage applied between the negative terminals 35 and ground. However, the output voltage would nevertheless decrease as current supplied to the load increased because of losses in the components of the circuit. Thus it will be seen that in the voltage regulating circuit utilized herein, the voltage supplied to the load 22a is maintained substantially constant whether the voltage between the terminals 35 and ground fluctuates or the current drawn by the load 22a varies.

Assuming that the voltage on the resistor 34 does not vary, the emitter-base voltage of the transistor 87 will be maintained at a constant value by the zener diode 44. If the voltage applied by a D.-C. energizing source between the negative terminals 35 and the ground 26 increases, the voltage on the potentiometer 91 will increase and, consequently, the potential applied to the base electrode of the transistor 86 from the wiper arm 91a will become more positive with respect to the emitter electrode. This causes the conduction of the transistor 86 to increase thereby drawing off some of the base-emitter current flowing through the transistor 81 via the resistor 96 from ground. As a result, the conduction of the transistor 81 decreases thereby substantially cancelling the voltage increase which otherwise would have appeared on the lead 52 with respect to the negative terminal 35.

It will be clear, that if the D.-C. source voltage decreases, the conduction of the transistor 86 will also decrease. The effect of this is to increase the conduction of the transistor 81 thereby preventing the fluctuation of the D.-C. source voltage from affecting the potential on the lead 52. Thus the energizing voltage which is supplied to the oscillator from the wiper arm 85a of the potentiometer 85 is prevented from varying as D.-C. source voltage fluctuates. Since the driver section 11 is energized by voltage from the same point through leads 51 and 52, the output voltage of the driver section is also stabilized with respect to variations of the D.-C. source voltage or load current.

To the end that the output voltage and output current of the frequency generator as manifested on the output winding 22 of the transformer 19 will be reduced to substantially zero in the event that the impedance of the load 22a becomes less than a predetermined value, the control circuit section 13 is provided. The control circuit section 13 may include suitable rectifiers 97 and 98 connecting opposite ends of the winding 25 to one end of a resistor 99 which serves, with the winding 25 and rectifiers 97 and 98, as output voltage responsive means. The control circuit 13 is completed by a lead 100 connecting the center tap of the winding 25 to the other end of the resistor 99. A slider 99a is provided on the resistor 99 so that a desired portion of the voltage appearing on the resistor 99 may be utilized to effect a comparison to the voltage across the resistor 34 or load current responsive means through connections which will be described hereinafter.

The voltage on the resistor 99 is proportional to the voltage of the winding 25 which is, in turn, proportional to the voltage of the output winding 22. Thus, the resistor 99 is an output voltage proportional element.

In order to provide a bistable voltage source, the voltage of which will be added to that of the resistor 34 to buck the voltage of the resistor 99, a diode 101 and a resistor 102 are serially connected across the resistor 99. An operating point for the diode 101 is established by the resistor 102 which determines the magnitude of current flowing through the diode when a given voltage is present on the winding 25.

Since the control circuit winding 25 is wound on the core 20 of the output transformer, that winding is coupled to the output of the power bridge formed by transistors 15, 16, 17 and 18. This coupling is effected by transformer action between the winding 25 and the primary winding 21 which is connected between the collector electrodes of the transistors 17 and 18. Accordingly, it will be seen that the winding 25 may, if desired, be wound as a secondary winding on a separate transformer. A primary winding of the separate transformer may be connected between the collector electrodes of transistors 17 and 18 whereby voltage proportional to that of the output winding 22 is applied to the resistor 99.

The voltage of the diode 101 is either zero or a specific relatively constant value dependent upon the magnitude of current flowing therethrough. This current is, in turn dependent upon the voltage of the winding 25 and, due to the operating point produced by the resistor 102, can vary considerably without causing any change in the voltage of the diode 101. However, due to the currentvoltage characteristic of the diode 101, when the voltage on the winding 25 and the resulting current through the diode become very small, the voltage of the diode will decrease very sharply to zero. Thus the diode 101 serves as a bistable voltage source.

With regard to load current considerations, the diode 101 has the effect of adding a constant, false current to the load current. This false current becomes increasingly significant after cutoff action occurs since the voltage and current of the windings 21 through 25 decrease due to cutoff action while the false current remains constant. This false current causes the control circuit 13 to immediately reduce the output voltage and current of the frequency generator to substantially zero when the load impedance becomes less than a predetermined value. Thus the frequency generator switches from a normal or first state of operation to a cutoff or second stable state of operation under overload conditions.

By connecting the diode 101 and the resistor 34 in such a manner that the sum of the voltages on those elements opposes the voltage developed on the output voltage responsive element 99, a resultant voltage is produced on the latter. This voltage controls a cutoff switch which will now be described. When the cutoff switch is closed, the output voltage and current of the frequency generator are reduced to zero.

The fact that the voltage of the diode 101 switches from a constant value to zero when the voltage on the winding 25 becomes low is advantageous in that it facilitates return of the frequency generator to normal operation when the overload is removed. With zero voltage on the diode 101, the voltage on the load current responsive means 34 is compared directly to the voltage of the resistor 99. Consequently, when a pulsing, sensing output is provided to the load 22a as will be described presently, the voltage produced on the resistor 99 will be greater than the voltage on the resistor 34. This causes the cutoff switch to close thereby rendering the frequency generator operative.

It will be clear that if the diode 101 were a constant voltage device, the frequency generator would not return to normal operation even if the overload condition were removed. This would result because after cutoff the voltage of the diode 101 would always be much greater than the voltage of the resistor 99 and would keep the cutoff switch closed. Thus, the advantage of the bistable voltage source is apparent.

To the end that the oscillator section 10 will be rendered inoperative in the event that the sum of the voltages on the resistor 34 and the diode becomes greater than the voltage of the resistor 99, an N-P-N type transistor 104 is provided to serve as a cutoff switch. The emitter electrode of the transistor 104 is connected to a negative terminal 35 by means of a lead 105 while the collector electrode of that transistor is connected to a common point 106 between the diodes 79 and 80 of the oscillator section 10 via diodes 107, 108, 109 and the lead 110. The diodes 107 through 109 and the collector-emitter path of the transistor 104 are, therefore, connected across the tank circuit including the winding 54 and the capacitor 53 and which serves as the output means of the oscillator section 10. Consequently, when the transistor 104 conducts, the diodes 107 through 109 provide a low resistance path which stalls the oscillator section 10 by preventing oscillating current in the output means. Consequently, the input voltage to the driver section 11 is removed and there is no output voltage or current from the power section 12.

The slider 99a of the resistor 99 is connected to the base electrode of the transistor 104 through a resistor 111 and a lead 112 to control the conduction of the transistor. The slider 99a may be adjusted to set the load current value at which cutoff will occur. A capacitor 113 may be connected between the leads 105 and 112 to integrate and smooth the voltage appearing therebetween.

When the frequency generator is operating normally, the voltage on the capacitor 113 is of such polarity as to bias the transistor 104 in an off condition. However, if the load impedance drops below a predetermined value, the voltage of the capacitor 113 must reverse in polarity to render the transistor 104 conducting. Because a certain amount of time is required to accomplish this polarity reversal and because it is highly desirable that the cutoff action of the control circuit occur very rapidly, the polarity reversing time should be very short. To this end a diode 114 is connected between the lead 105 and the lead 112.

The diode 114 limits the magnitude of the reverse bias voltage on the capacitor 113 to a minimum value just sufficient to prevent the transistor 104 from conducting unless an overload condition occurs. Accordingly, the time required to charge the capacitor 113 such that a forward bias is provided for the transistor 104 is minimized.

The control circuit 13 is completed by a diode 115 connected in parallel with the diode 101 but poled to pass current in an opposite sense thereto. In the event a sudden current surge traverses the resistor 34, the diode 101 because of its unidirectional nature will block current which tends to flow toward the capacitor 113 through the resistor 99. The diode 115 bypasses this current around the diode 101 enabling the capacitor 113 to reverse polarity. This aids the cutoff action of the control circuit by greatly increasing its speed of response to load current surges.

Operation of the foregoing circuitry will now be described. When a suitable D.-C. source is connected between the negative terminals 35 and the grounds 26, current will flow from ground 26 through the resistor 82, the collector-emitter path of the transistor 81 and the potentiometer 85 to the negative terminal 35. Current will also flow from the ground 26 through the resistor 96, the resistor 89, the collector-emitter path of the transistor 86 and the resistor 88 to the negative terminal 35.

After a constant voltage is established across the zener diode 94 by the current flowing from the junction point 92 to a negative terminal 35 by way of the resistor 34, the transistors 86 and 87 control the conduction of the transistor 81 to regulate the voltage on the lead 52 with respect to the negative terminal 35 as explained previously. The voltage on the lead 52 is applied to the oscillator section 10 through a resistor 68 and a lead 67 and to the driver section 11 via a lead 51. It will be seen that the voltage of the D.-C. energizing source is applied directly across the bridge configuration comprising the transistors 15 through 18.

When the regulated voltage is applied to the center tap of the primary winding 64 of the oscillator transformer 55, the transistors 62 and 63 begin to alternately and severally conduct whereby supplying current pulses to the tank circuit formed by the winding 54 and the capacitor 53. These pulses of current cause the tank circuit to oscillate and the sinusoidal voltage developed thereacross is applied to the base electrodes of the transistors 45 and 46 through the negative feedback windings 23 and 24, respectively, of the output transformer 19.

The transistors 45 and 46 are connected in a push-pull arrangement and conduct alternately through respective halves of the primary winding 41 of the driver transformer 43. Bias for those transistors is provided by the voltage across the diodes 73 through 75 which are connected to the base electrodes of the transistors 45 and 46 through the lead 72 and respective halves of the winding 54 of the oscillator transformer 55. While the driver section 11 shown herein utilizes a single pair of transistors, it will be understood that the power amplification of the driver section may be increased by connecting additional transistors in parallel with each of the transistors 45 and 46.

The current produced in the primary winding 41 of the driver transformer 43 by the transistors 45 and 46 induces voltage on the drive windings 38, 39 and 40. When the polarity of the voltages on the drive windings is of a first sense, the transistors 15 and 18 conduct, causing current to flow upwards through the primary winding 21 of the output transformer 19. When the voltage on the drive windings reverses, the transistors 16 and 17 will conduct and current will flow downwardly through the primary winding 21. Whichever pair of the transistors 16 and 17 or 15 and 18 conduct, current always flows in a direction from the junction 29 toward a negative terminal 35 through the resistor 34.

The current traversing the primary winding 21 of the output transformer 19 induces voltage on the negative feedback windings 23 and 24, on the output winding 22 and on the winding 25. The negative feedback windings 23 and 24 are connected to the base electrode of the transistors 45 and 46, respectively, in such a manner that the voltage on those windings opposes the input voltage being applied to the transistors 45 and 46 thereby reducing distortion of the sinusoidal voltage produced on the drive windings 38, 39 and 40. This negative feedback arrangement also aids in stabilization of the output voltage appearing on the output winding 22 since changes of the output voltage produce a cancelling effect in the driver circuit 11 through the action of the negative feedback windings 23 and 24.

Referring to the control circiut 13, the voltage polarities on the resistor 34, the diode 101 and the resistor 99 are as indicated in the figure while current is being supplied to the load 22a. Considering a voltage loop including the resistor 34, lead 103, diode 101, the portion of resistor 99 between lead 100 and the slider 99a, the portion of resistor 111 and the base-emitter electrodes of the transistor 104, it will be seen that the voltages of the resistor 34 and the diode 101 are in the same sense and are in opposition to the voltage on the resistor 99.

When the voltage between the slider 99a and the diode 101 is greater than the total voltage of resistor 34 and the diode 101, the base electrode of the transistor 105 is more negative than the emitter electrode thereof preventing the transistor from conducting. As explained previously, the capacitor 113 integrates the voltage applied between the base and emitter electrodes of the transistor 104 while the diode 114 limits this reverse bias voltage of the transistor in order to facilitate rapid reversal of the bias voltage in the event of an overload condition.

Assuming that the current drawn by the load 22a from the output winding 22 increases slowly from a low value, the current and voltage of the potentiometer 34 will increase in proportion to the load current. As the load current approaches a maximum predetermined value corresponding to a minimum predetermined load impedance, the sum of the voltages of the potentiometer 34 and the diode 101 is nearing the voltage between the slider 99a and the lower end of the resistor 99 in magnitude. Under these conditions, the voltage on the resistor 34 is much greater than that of the diode 101 so the latter is relatively insignificant.

When the impedance of the load 22a becomes less than the predetermined minimum value, the voltage of the potentiometer 34 plus the voltage of the diode 101 becomes greater than the voltage on the lower portion of the resistor 99. Consequently, the voltage across the capacitor 113 reverses causing the transistor 104 to conduct.

Due to the conduction of the transistor 104, the opposite sides of the tank circuit formed by the capacitor 53 and the secondary winding 54 of the oscillator transformer 55 are connected to a negative terminal 35 via the diodes 79 and 80, the diodes 107 through 109 and the collector-emitter path of the transistor 104. The diodes 107 through 109 provide a low impedance path substantially across the output of the oscillator section 10 when the transistor 104 conducts. Accordingly, as the conduction of the transistor 104 increases, the A.-C. voltage supplied from the oscillator to the driver will decrease causing the voltage on the windings of the output transformer 19 to decrease.

As a consequence of the decreased voltage on the windings of the output transformer 19, the voltage supplied to the resistor 99 from the winding 25 decreases, the current through the network including the diode 101 and the resistor 102 decreases and the current and voltage of the potentiometer 34 decrease. However, because the diode 101 is operated in a forward biased condition, its voltage remains relatively constant until the current therethrough becomes very low. Thus, as the voltage of the resistor 34 and the voltage of the resistor 99 decrease after the current being supplied to the load 22a exceeds the predetermined maximum value, the constant voltage across the diode 101 becomes the predominating factor in the voltage loop which includes the resistor 34, the diode 101 and the resistor 99.

Because the voltage of the diode 101 remains constant as the voltages of the resistor 34 and resistor 99 fall, a cumulative action ensues. In this action, as the voltage of the diode 101 becomes more significant, the conduction of the transistor 104 increases thereby decreasing the voltages of the windings of the output transformer 19. Accordingly, the voltages of the resistor 34 and resistor 99 also decrease making the voltages of the diode 101 still more significant.

The foregoing cumulative action continues until the transistor 104 is fully conducting at which time the output voltage of the oscillator 10 and the voltage on the windings of the output transformer is substantially zero. Just prior to this time, when the current through the diode 101 becomes very small, the voltage of that diode drops suddenly from its constant value to zero. This allows the transistor 104 to be turned off by the voltage of the resistor 99 to reactivate the oscillator when the impedance of the load becomes great enough so that an overload condition no longer exists.

The frequency generator is now in a cutoff second state of operation. However, a very small output voltage is supplied at intervals to the load 22a to provide a pulsing, sensing action. This pulsing sensing action occurs due to the charging and discharging activity of the capacitor 113.

After cutoff of the frequency generator takes place, the capacitor 113 begins to discharge through the base-emitter path of the transistor 104. As the capacitor voltage decreases, the transistor 104 begins to decrease in conduction causing the oscillator section to supply voltage to the windings of the output transformer 19 through the driver and amplifier sections 11 and 12, respectively. If the impedance of the load is too low, the voltage produced on the resistor 34 will be much greater than the voltage on the resistor 99 and will recharge the capacitor to maintain the conduction of the transistor 104.

This pulsing action will continue until the impedance of the load becomes greater than the predetermined minimum value at which time the voltage on the lower portion of the resistor 99 becomes greater than the voltage of the resistor 34, the voltage of the diode 101 being zero at this time. As a result, a normal first stable state of operation of the frequency generator resumes.

The diode 115, as explained previously, provides for rapid cutoff of the frequency generator in the event of sudden surges of load current. Any load current surge will cause a sudden increase in the voltage of the resistor 34. The voltage of the resistor 34 is connected in relationship to the voltage on the power portion of the resistor 99 by means of the diode 115. Thus, if the voltage of the resistor 34 suddenly becomes greater than the voltage on the lower portion of the resistor 99, the transistor 104 will conduct thereby reducing to zero the output voltage and current supplied to the load 22a until the cause of the current surge ends.

From the foregoing it will be seen that there is provided a control circuit which immediately reduces the output voltage and current of a frequency generator to substantially zero in the event that the impedance of a load connected thereto becomes less than a predetermined value wherein more than a maximum predetermined value of current would be drawn from the generator. The control circuit also reduces the output voltage and current of the generator upon the occurrence of surging of the output current. In order to return the frequency generator to normal operation when the impedance of the load becomes sufficiently high, the control circuit provides a pulsing, sensing action of the generator.

It will be understood that the embodiment shown herein is for explanatory purposes and may be changed or modified without departing from the spirit and scope of the invention as set forth in the claims appended hereto.

What I claim is:

1. In a frequency generator adapted to operate from a D.-C. source and having an oscillator, an amplifier, an output transformer provided with a primary and secondary windings and means for connecting the output of the oscillator across the primary winding of the output transformer through said amplifier, a load being connected across one of said secondary windings, in combination, a control circuit including an output voltage responsive element, load current responsive means, bistable voltage means, winding means coupled to the output of said amplifier, means for connecting said load current responsive means in the current path in said amplifier, rectifying means connecting said output voltage responsive element and said bistable voltage means in energy receiving relationship to said winding means, means for connecting said load current responsive means, said bistable voltage means and said output voltage responsive element in circuit relationship to produce a resultant voltage on said output voltage responsive element, switch means, means for connecting said output voltage responsive element to said switch means to control the conduction of said switch means and means for connecting said switch means to said oscillator to de-energize the oscillator when the impedance of said load falls below a predetermined value.

2. In a frequency generator adapted to operate from a D.-C. source and including an oscillator, an amplifier, an output transformer having a primary and secondary windings and means for connecting the output of the oscillator across the primary winding of the transformer through said amplifier, in combination, a control circuit section having output voltage responsive means including one of the secondary windings and unidirectional conducting means, and means for connecting said unidirectional conducting means to said secondary winding to provide a poled D.-C. output from said voltage responsive means, load current responsive means connected serially in the current path in said amplifier, bistable voltage means connected in output voltage responsive relationship to said one of said secondary windings, means for connecting said bistable voltage means between said load current responsive means and one pole of said output voltage responsive means and in opposition to the voltage of said output voltage responsive means whereby a difference voltage is produced at the other pole, switch means, means for connecting said other pole of said output voltage responsive means to said switch means to close the same when the sum of the voltages of said load current responsive means and said bistable voltage means exceeds the voltage of said output voltage responsive means, means for connecting said switch means between said oscillator and said D.-C. source to energize and de-energize the oscillator in accordance with the conducting condition of said switch means.

3. In a frequency generator adapted to operate from a poled D.-C. source and including an oscillator, an amplifier, an output transformer having a primary and secondary windings and means for connecting the output of the oscillator across the primary winding of the output transformer through said amplifier, a load being connected across one of said secondary windings, in combination, a control circuit including first resistive means connected between the amplifier and one pole of the D.-C. source, rectifying means, second resistive means, means for connecting said rectifying means between said second resistive means and another of the windings of said output transformer, a series combination of a third resistive means and first diode means, said series combination being connected across said second resistive means, means for connecting a point between said amplifier and said first resistive means to a point between said third resistive means and said first diode means, voltage dropping means, a transistor having an emitter electrode connected to said one pole of the D.-C. source, a collector electrode connected to said oscillator through said voltage dropping means and a base electrode connected to said second resistive means, a capacitor connected between the base and emitter electrodes of said transistor, second diode means connected between the base and emitter electrodes of said transistor to limit the reverse bias applied to said transistor, third diode means connected in parallel with said first diode means but poled to pass current in the opposite sense to the current of said first diode whereby sudden surges of current in said first resistive means are bypassed around said first diode means.

4. In a frequency generator adapted to operate from a poled D.-C. source and including an oscillator, an amplifier, an output transformer having a primary and secondary windings and means for connecting the output of the oscillator across the primary winding of the output transformer through said amplifier, a load being connected across one of said secondary windings, in combination, a control circuit including first resistive means connected between the amplifier and one pole of the D.-C. source, rectifying means, second resistive means, means for connecting said rectifying means between said second resistive means and another of the windings of said output transformer, a series combination of a third resistive means and first diode means, said series combination being connected across said second resistive means, means for connecting a point between said amplifier and said first resistive means to a point between said third resistive means and first diode means, switch means, means for connecting said second resistive means to said switch means to control the conduction thereof, means for connecting said switch means to said oscillator to de-energize the same when the impedance of the load falls below a predetermined value.

5. In a frequency generator adapted to operate from a D.-C. source and having an oscillator, an amplifier, an output transformer provided with a primary and secondary windings and means for connecting the output of the oscillator across the primary winding of the output transformer through said amplifier, a load being connected across one of said secondary windings, in combination, a control circuit including an output voltage responsive element, load current responsive means, bistable voltage means, winding means coupled to the output of said amplifier, means for connecting said load current responsive means in the current path in said amplifier, rectifying means connecting said output volatge responsive element and said bistable voltage means in energy receiving relationship to said winding means, means for connecting said load current responsive means, said bistable voltage means and said output voltage responsive element in circuit relationship to produce a resultant voltage on said output voltage responsive element, unidirectional current conducting means, a transistor having an emitter electrode connected to the D.-C. source, a collector electrode connected to said oscillator through said unidirectional current conducting means, and a base electrode connected to said output voltage responsive element whereby said transistor conducts to de-energize said oscillator when the impedance of the load falls below a predetermined value, a capacitor connected to said base electrode of said transistor to integrate the bias voltage applied thereto and to provide a pulsing, sensing action when the control circuit is maintaining the frequency generator in a cutoff state.

6. In a frequency generator adapted to operate from a D.-C. source and including an oscillator, an amplifier, an output transformer having a primary and secondary windings and means for connecting the output of the oscillator across the primary winding of the transformer through said amplifier, in combination, a control circuit section including output voltage responsive means comprising one of the secondary windings and unidirectional conducting means, and means for connecting said unidirectional conducting means to said secondary winding to provide a poled D.-C. output from said voltage responsive means, load current responsive means connected serially in the current path in said amplifier, bistable voltage means connected in energy receiving relationship to said output voltage responsive means, means for connecting said bistable voltage means between said load current responsive means and one pole of said output voltage responsive means and in opposition to the voltage of said output voltage responsive means whereby a difference voltage is produced at the other pole, voltage dropping means, a transistor having collector, emitter and base electrodes, means for connecting said emitter electrode to said D.-C. source, means for connecting said base electrode to said other pole of said output voltage responsive means to control the conduction of said transistor, a capacitor connected between the base and emitter electrodes of said transistor, means connected between the base and emitter electrodes of said transistor to limit the reverse bias thereof, means for connecting said voltage dropping means between the collector electrode of said transistor and the oscillator to reduce the output of the oscillator to substantially zero when said transistor conducts.

7. In a frequency generator adapted to operate from a D.-C. source and having an oscillator, an amplifier, an output transformer provided with a primary and secondary windings and means for connecting the output of the oscillator across the primary winding of the transformer through the amplifier, a load being connected across one of said secondary windings, in combination, a control circuit including load current responsive means and an output voltage responsive element, means for connecting said load current responsive means in the current path in said amplifier, unidirectional current conducting means, means for connecting said unidirectional current conducting means between said output voltage responsive element and another of said secondary windings of said output transformer to supply voltage to said output voltage responsive element, a diode and a resistor serially connected across said output voltage responsive element, wherein said diode is forward biased, means for connecting said load current responsive means to a point between said diode and said resistor, variable conducting means having first and second power electrodes and a control electrode, means for connecting said control electrode to said output voltage responsive element to control the conduction of said variable conducting means, means for connecting said first and second power electrodes to said D.-C. source and said oscillator, respectively, to reduce the output of said oscillator to substantially zero when the impedance of the load is below a predetermined value, capacitive means connected between said control electrode and said first power electrode of said variable conducting means to provide a pulsing, sensing action when the frequency generator is in a cutoff state.

8. In a frequency generator adapted to operate from a D.-C. source and having an oscillator, an amplifier, an output transformer provided with a primary and secondary windings and means for connecting the output of the oscillator across the primary winding of the output transformer through said amplifier, a load being connected across one of said secondary windings, in combination, a control circuit including output voltage responsive element, load current responsive means, bistable voltage means, winding means coupled to the output of said amplifier, means for connecting said load current responsive means in the current path in said amplifier, rectifying means connecting said output voltage responsive element and said bistable voltage means in energy receiving relationship to said winding means, means for connecting said load current responsive means, said bistable voltage means and said output voltage responsive means in circuit relationship to produce a difference voltage on said output voltage responsive means, a diode connected in parallel with said bistable voltage means to bypass current therearound in the opposite sense to normal current of said bistable voltage means, means for connecting at least an additional one of said secondary windings of said output transformer between the output of said oscillator and said amplifier in voltage opposition to the output voltage of said oscillator whereby variation in the voltage on said winding means is minimized, unidirectional current conducting voltage dropping means, variable conducting means having first and second power electrodes and a control electrode, means for connecting said control electrode to said output voltage responsive element to control the conduction of said variable conducting means, means for connecting said first and second power electrodes of said variable conducting means substantially across the output of said oscillator, said means including said unidirectional current conducting voltage dropping means whereby conduction of said variable conducting means decreases the voltage on said output of the oscillator to zero thereby causing cutoff of the frequency generator.

9. In a frequency generator adapter to operate from a D.-C. source, in combination, an oscillator having a tank circuit, a driver circuit, an amplifier and an output transformer provided with a primary winding and first, second, third and fourth secondary windings, means for connecting said first secondary winding to a load, means for connecting said second secondary winding between one side of said oscillator tank and said driver circuit, means for connecting said third secondary winding between the other side of said oscillator tank circuit and said driver circuit, said second and third secondary windings being connected in voltage opposition to the voltage of said tank circuit to minimize variations of the voltage on said fourth secondary winding, first resistive means connected between the amplifier and the D.-C. source, rectifying means, second resistive means, means for connecting said rectifying means between said second resistive means and said fourth winding of said output transformer, third resistive means and first diode means serially connected across said second resistive means, means for connecting a point between said amplifier and said first resistive means to a point between said third resistive means and said first diode means, unidirectional current conducting voltage dropping means, a transistor having a base, emitter and collector electrodes, means for connecting the base electrode of said transistor to said second resistive means to control the conduction of said transistor, capacitive means connected between the base and emitter electrodes to integrate the base-emitter voltage and to provide a pulsing, sensing action when the impedance of the load is below a predetermined value, means for connecting the collector electrode of said transistor to said one side and to said other side of said oscillator tank circuit, said means including said unidirectional current conducting voltage dropping means, means for connecting said emitter electrode of said transistor to an intermediate point on said tank circuit whereby when said transistor conducts oscillating current in the tank circuit is suppressed.

10. In a frequency generator adapted to operate from a D.-C. source and having an oscillator, an amplifier, an output transformer provided with primary and secondary windings and means for connecting the output of the oscillator across the primary winding of the outlet transformer through said amplifier, a load being connected across one of said secondary windings, in combination, a control circuit including output voltage responsive means coupled in energy receiving relationship to the output transformer, load current responsive means connected serially in the current path in the amplifier, bistable voltage means coupled in energy receiving relationship to the output transformer, means for connecting said load current responsive means, said bistable voltage means and said output voltage responsive means in circuit relationship to produce a resultant voltage at a point on said output voltage responsive means, switch means, means for connecting said point on said output voltage responsive means to said switch means to control the conduction of said switch means and means for connecting said switch means to said oscillator to de-energize the oscillator when the impedance of said load falls below a predetermined value.

11. In a frequency generator adapted to operate from a D.-C. source and having an oscillator, an amplifier, an output transformer provided with a primary and secondary windings and means for connecting the output of the oscillator across the primary winding of the output transformer through said amplifier, a load being connected across one of said secondary windings, in combination, a control circuit including output voltage responsive means coupled in energy receiving relationship to the output transformer, load current responsive means connected in the current path in said amplifier, a series combination of a diode and a resistor, rectifying means connected between one of said secondary windings and said series combination to supply energy thereto, means for connecting said load current responsive means, said diode of said series combination and said output voltage responsive means in circuit relationship to produce a resultant voltage on said output voltage responsive means, switch means, means for connecting said output voltage responsive means to said switch means to control the conduction of said switch means and means for connecting said switch means to said oscillator to de-energize the oscillator when the impedance of said load falls below a predetermined value.

12. In a frequency generator adapted to operate from a D.-C. source and having an oscillator, an amplifier, an output transformer provided with a primary and secondary windings and means for connecting the output of the oscillator across the primary winding of the transformer through the amplifier, a load being connected across one of said secondary windings, in combination, a control circuit including load current responsive means and an output voltage responsive element, means for connecting said load current responsive means in the current path in said amplifier, unidirectional current conducting means, means for connecting said unidirectional current conducting means between said output voltage responsive element and another of said secondary windings of said output transformer to supply voltage to said output voltage responsive element, bistable voltage means and resistive means serially connected across said output voltage responsive element, means for connecting said load current responsive means to a point between said bistable voltage means and said resistive means, variable conducting means having first and second power electrodes and a control electrode, means for connecting said control electrode to said output voltage responsive element to control the conduction of said variable conducting means, means for connecting said first and second power electrodes to said D.-C. source and said oscillator, respectively, to reduce the output of said oscillator to substantially zero when the impedance of the load is below a predetermined value, capacitive means connected between said control electrode and said first power electrode of said variable conducting means to provide a pulsing, sensing action when the frequency generator is in a cutoff state.

References Cited by the Examiner
UNITED STATES PATENTS 3,156,877　11/1964　Merkel _____ 331—113
3,200,348　8/1965　Kammiller et al. _____ 331—62
3,234,452　2/1966　Ganszky et al. ____ 331—62 X ROY LAKE, *Primary Examiner.*

S. H. GRIMM, *Assistant Examiner.*